United States Patent [19]
Sinden

[11] 3,855,427
[45] Dec. 17, 1974

[54] MAIN DISTRIBUTION FRAME INTERCONNECTION WIRING TECHNIQUE AND APPARATUS

[75] Inventor: Frank William Sinden, Summit, N.J.

[73] Assignee: Bell Telephone Laboratories Incorporated, Murray Hill, N.J.

[22] Filed: Oct. 29, 1973

[21] Appl. No.: 410,561

[52] U.S. Cl. .................. 179/98, 179/91 R, 317/122
[51] Int. Cl. .............................................. H04q 1/06
[58] Field of Search ...... 179/98, 91 R; 317/101 CE, 317/122

[56] References Cited

UNITED STATES PATENTS

| | | | |
|---|---|---|---|
| 1,633,118 | 6/1927 | McElvea | 179/98 |
| 2,169,727 | 8/1939 | Graham | 179/98 |
| 3,566,004 | 2/1971 | Creedon | 179/98 |
| 3,710,030 | 1/1973 | Dartois | 179/98 |
| 3,800,097 | 3/1974 | Maruscak et al. | 179/98 |

*Primary Examiner*—Kathleen H. Claffy
*Assistant Examiner*—Gerald L. Brigance
*Attorney, Agent, or Firm*—C. S. Phelan

[57] ABSTRACT

On a main distribution frame for a telecommunication switching center, a portion of the terminal pairs in each of a plurality of sectors of the frame is permanently interconnected to similar terminal pairs in all other sectors. The remaining terminal pairs in each sector are dedicated for use in permanently terminating subscriber line cable pairs and switching equipment cable pairs as is usual in main distribution frames. A specified subscriber line terminal pair is connected to a specified switching equipment terminal pair by a single jumper cable if the two terminal pairs are located nearby each other on the main frame. Where the two terminal pairs are not so located, the specified subscriber line terminal pair is connected to the specified switching equipment terminal pair, located in a remote sector of the frame, by two short jumper cables and an intermediate pair of the permanently interconnected sector terminals that are respectively nearby the specified subscriber line terminal pair and the specified switching equipment cable pair.

11 Claims, 6 Drawing Figures

PATENTED DEC 17 1974 3,855,427

SHEET 1 OF 5

PATENTED DEC 17 1974 3,855,427

SHEET 5 OF 5

MAIN DISTRIBUTION FRAME INTERCONNECTION WIRING TECHNIQUE AND APPARATUS

BACKGROUND OF THE INVENTION

1. Field of the Invention

This invention relates to telephone central office main distribution frames and, in particular, to apparatus and methods for wiring such frames.

2. Description of the Prior Art

The main distribution frame has been associated with telephone central offices since before the telephone system began to be mechanized. This equipment serves as an interface between the switching equipment — the inside plant — and the exchange cable network of subscriber lines — the outside plant. Both the subscriber line cable pairs and the switching equipment cable pairs are permanently terminated on one side of the main frame which is typically referred to as the back plane. The main function of the main distribution frame is to establish a point of flexibility in the telephone system where any specified one of the subscriber line terminal pairs on the outside plant side is connectable to any specified one of the terminating points on the switching equipment side. To perform this function in an organized way, the main distribution frame must hold all of the cross-connecting wires, which are called jumper cables and are located on the front side of the frame, in a way that permits operating personnel to find one particular terminal pair out of thousands of terminal pairs and to interconnect or to change the connection of this terminal pair with another terminal pair.

One of the basic problems with main distribution frames is that in large switching centers main frames can grow to lengths of over 200 feet. With main distribution frames of such length, the interconnections of widely spaced apart terminal pairs requires jumper cables of a length comparable to the length of the main frame. Once jumper cables of lengths greater than a few tens of feet are installed, it becomes extremely difficult to remove them when wiring changes are made. Quite frequently, the removal of a relatively long jumper cable from the main distribution frame will result in the abrading and burning of the insulation of neighboring jumper cables. Allowing an abraded jumper cable to remain on the main frame would cause it to be susceptible to malfunction through short circuits. Consequently, those jumper cables no longer in service are generally allowed to remain in place with new jumper cables installed over top of the old jumper cables. In addition, the wiring of main distribution frames many feet in length requires more than one wireman to make an interconnection or to effect a change in wiring. The result of this process of administering and wiring the main distribution frame leads to increasing degrees of jumper cable congestion and the ultimate failure of the main frame.

Accordingly, it is one object of the present invention to reduce the degree of jumper cable congestion on a main distribution frame.

A further object is to reduce the density of interconnection jumper cables.

An additional object is to facilitate the removal of jumper cables no longer in active service.

Still another object of the present invention is to reduce the length of interconnection jumper cables.

Yet a further object is to decrease the number of wiring personnel needed to effect a wiring change on a main distribution frame.

SUMMARY OF THE INVENTION

The foregoing and other objects of the invention are realized in an illustrative embodiment of an interconnection wiring technique and apparatus for a main distribution frame wherein any specified subscriber line terminal pair is connectable to any specified switching equipment terminal pair by the use of short, easily removable jumper cables only. This method of wiring a main distribution frame is implemented by dividing an entire array of terminal pairs into three interleaved categories of terminal pairs: subscriber line terminal pairs, switching equipment terminal pairs and long jump terminal pairs. The entire array of terminal pairs containing the three categories is then partitioned into a plurality of sectors or subarrays. Each subarray is physically realized as a connector block and has a group of long jump terminal pairs equal in number to the total number of subarrays in addition to a number of subscriber line terminal pairs and switching equipment terminal pairs. Each of the subarrays or connector blocks is permanently interconnected to every other subarray on the back plane of the main frame by interconnecting the long jump terminal pairs in a prescribed pattern.

Interconnection of specified subscriber line terminal pairs with specified switching equipment terminal pairs is effected directly with a single jumper cable when the terminal pairs are in close proximity with one another. Where the terminal pairs are not close to one another, a first connection is made between the specified subscriber line terminal pair and a first long jump terminal pair. A second connection is made between the specified switching equipment terminal pair and a second long jump terminal pair which is connected to the first long jump terminal pair via the permanent back plane wiring.

Utilization of this interconnection wiring technique greatly reduces the amount of jumper cable congestion on the main distribution frame since only short jumper cables are used to make an interconnection. Moreover, because the jumper cables are short with respect to the length of the main frame, removal of inactive jumper cables is facilitated. This also has the effect of decreasing the density of jumper cables carried by the frame.

The utilization of short jumper cables results in a further advantage in that it allows the implementation of wiring changes by a single wireman. This in turn results in a decrease in the cost for effecting a wiring change. Also, the flexibility feature originally sought in the main distribution frame is restored.

BRIEF DESCRIPTION OF THE DRAWINGS

The aforementioned objects and advantages of the invention along with other objects and advantages will be better understood upon a consideration of the following detailed description and the appended claims in connection with the attached drawings in which:

DETAILED DESCRIPTION

Figure 1:
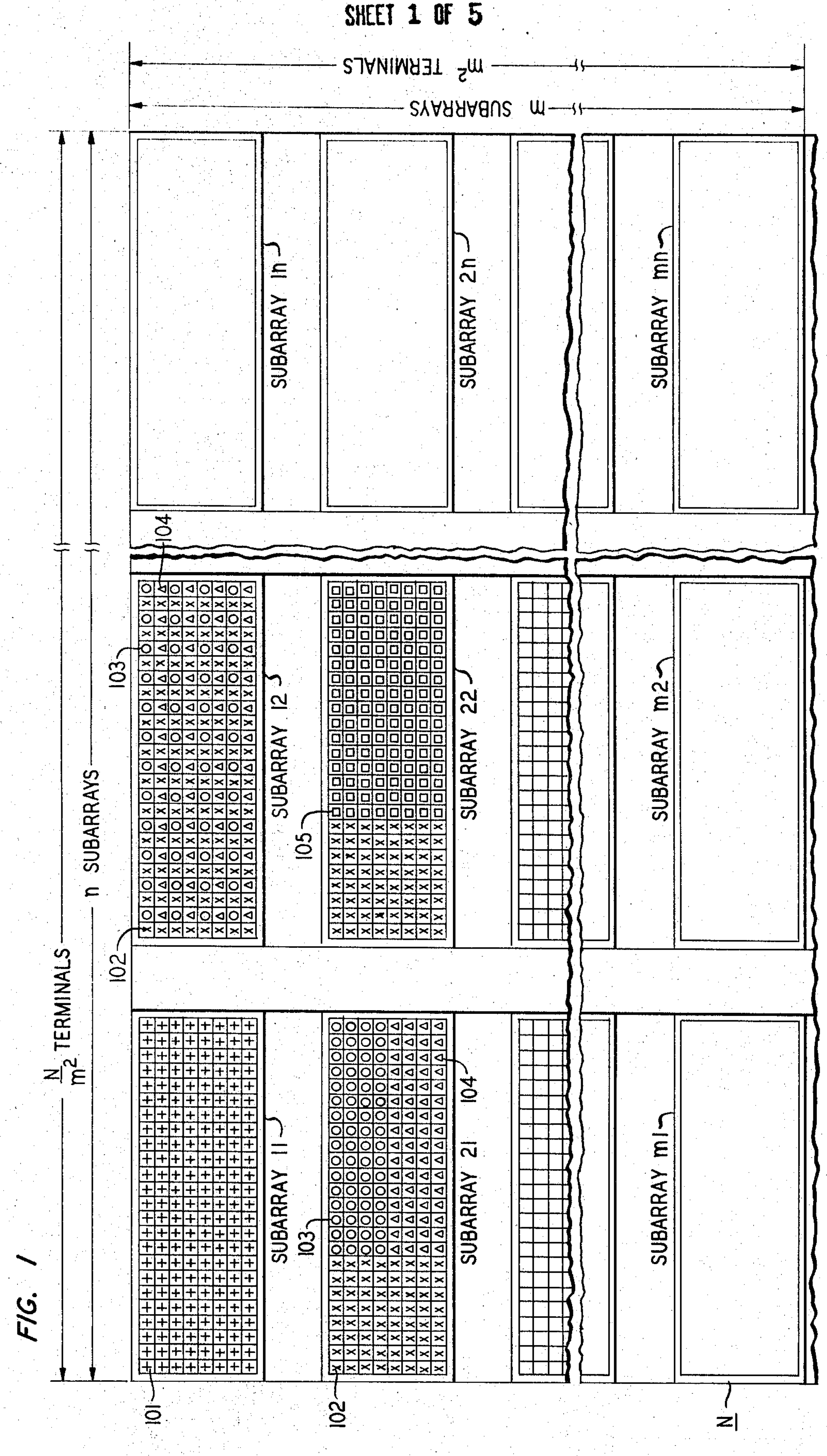
FIG. 1 is a schematic representation of a main distribution frame having an array of N terminal pairs as the frame is viewed from the front or jumper cable side.

In applying the interconnection wiring technique to a main distribution frame two different sets of operating conditions are to be considered. The first set of operating conditions corresponds to a worst case situation. In the worst case situation it is assumed that direct interconnection between specified subscriber line terminal pairs and specified switching equipment terminal pairs cannot be made with a single, short, easily removable jumper cable. Therefore, in keeping with the overall objective of eliminating jumper cable congestion, it is necessary to complete each interconnection through an intermediate, permanently wired path and a pair of short jumper cables. One of the short jumper cables connects the specified subscriber line terminal pair to one end of the intermediate path while the second short jumper cable connects the specified switching equipment terminal pair to the other end of the intermediate path. Under these conditions it should be evident that fifty percent of the terminal pairs on the main frame are used in supplying the intermediate connection paths with the remaining 50 percent equally divided between subscriber line terminal pairs and switching equipment terminal pairs.

While such a frame organization initially appears to double the required floor space and main frame equipment manufacturing costs, the ease of administration should more than offset the added capital expense within a few years. In addition, the problem of jumper cable congestion which, if left unchecked, can result in failure of the main frame, is completely circumvented.

One possible example where such conditions might obtain is the case of an existing main frame which has already been installed in a telephone central office. Under such conditions the number of terminal pairs and the size of the frame are fixed so that the freedom of design inherent in configuring a new frame is not available. This main frame might be operating at roughly 50 percent of its capacity, but jumper cable congestion is building up at an ever increasing rate. If this method of main frame utilization is permitted to continue, the main distribution frame could be expected to reach a point of total failure, within a short period of time, as a result of jumper cable congestion. For this situation, application of the interconnection wiring technique in rewiring the frame can be advantageously utilized to reverse the trend in jumper cable congestion.

The second set of operating conditions which is to be considered corresponds to a more favorable situation such as the case where a new main distribution frame is to be installed in a central office. In this case a more advantageous utilization of the main frame, as compared with the worst case situation, will result from the extra degrees of design freedom that inhere in configuring a new frame and from the application of the interconnection wiring technique along with the employment of a preferential terminal assignment plan.

Under a preferential terminal assignment plan an attempt is made to connect specified switching equipment terminal pairs to specified subscriber line terminal pairs using the shortest possible jumper cable. One instance when preferential assignment can be advantageously employed is illustrated, for example, in the case of a new subscriber requesting service. In this instance the subscriber's residence or place of business is connected to the switching central office via a particular exchange plant cable. This connection appears on the main distribution frame at a particular subscriber line terminal pair. By assigning to this subscriber a particular switching equipment terminal pair which has an appearance on the main frame nearby the subscriber line terminal pair, interconnection between the subscriber line terminal pair and the switching equipment terminal pair can be made with a single, short jumper cable. However, should the subscriber already have a particular switching equipment terminal pair assigned to him and then move from one location to another location, still served by the same central office, the subscriber line terminal pair and the switching equipment terminal pair which must be interconnected can be widely spaced apart on the main frame. In this situation preferential terminal assignment alone does not eliminate potential jumper cable congestion, but when coupled with the interconnection wiring technique hereinafter described, jumper cable congestion is eliminated.

Consideration of the first set of operating conditions, corresponding to the worst case situation, is best understood by referring to FIG. 1. Illustrated in FIG. 1 generally is a schematic representation of the front half or jumper cable side of a main distribution frame. The main distribution frame can be viewed as an array of terminal pairs 101, shown for illustration purposes as "+'s" in subarray 1, 1 only, with the total array having N terminal pairs 101 in it. In general, this array N can be further viewed as a matrix having $m^2$ terminal pairs 101 along any given column with $N/m^2$ terminal pairs 101 along any given row.

The first step in the application of the interconnection wiring technique in a worst case situation is to partition the array N of terminal pairs 101 into an array of sectors or subarrays. By using the matrix view of the array N of terminal pairs 101, wherein the number of terminal pairs 101 along any given column is $m^2$, and by making the number of subarrays in a column of subarrays equal to $m$, this ensures that the number of terminal pairs 101 in any subarray column is equal to the number of subarrays in any given column of subarrays. To complete the partitioning requires that the number of columns of terminal pairs 101 in each subarray be set so as to include in each subarray twice as many terminal pairs 101 as there are subarrays.

As noted previously, under worst case conditions it is assumed that the subscriber line terminal pairs and switching equipment terminal pairs can never be connected directly with a single, short, easily removable jumper cable. Consequently, two short jumper cables and an intermediate permanently wired path must be utilized. By including in each subarray twice as many terminal pairs 101 as there are subarrays allows one-half of the terminal pairs 101 to be used to establish permanently wired intermediate paths. This half of the terminal pairs 101 in a subarray are functionally categorized as long jump terminal pairs 102 and are represented in all of the other subarrays of FIG. 1 except subarray 1, 1 as "$x$'s". The remaining half of the terminal pairs 101 in each subarray are functionally categorized as subscriber line terminal pairs 103 and switching equipment terminal pairs 104 and are represented in subarrays 1, 2 and 2, 1 in FIG. 1 as "0's" and "Δ's", respectively.

The details regarding the establishment of the intermediate permanently wired interconnection between long jump terminal pairs 102 will be temporarily deferred until the second set of operating conditions have been considered.

One way of dividing or functionally distinguishing the three types of terminal pairs 102 through 104 is by a unique marking such as color coding. For example, by coloring all those terminal pairs 101 which are in odd numbered columns of a subarray with a first color, say red, long jump terminal pairs 102 are readily identifiable. By coloring those terminal pairs 101 which are in odd rows and which have not been previously color-coded with a second color, say blue, subscriber line terminal pairs 103 are also readily identifiable. Finally, by coloring the remaining uncolored terminal pairs 101 with a third color, say yellow, switching equipment terminal pairs 104 are also readily identifiable.

This grouping of terminal pairs 102 through 104 is shown in subarray 1, 2 of FIG. 1. An alternate grouping of these three functional categories of terminal pairs is shown in subarray 2, 1 with the long jump terminal pairs 102 occupying one section of the subarray and the subscriber line terminal pairs 103 and switching equipment terminal pairs 104 occupying the top and bottom half, respectively, of the remaining section of the subarray.

In summary, under the assumed worst case conditions the inclusion in each subarray of equal numbers of subscriber line terminal pairs 103 and switching equipment terminal pairs 104, which when added together are equal in number to the number of long jump terminal pairs 102, ensures that any specified subscriber terminal pair 103 is connectable to any specified switching equipment terminal pair 104 using at most two short jumper cables and an intermediate permanently wired path interconnecting long jump terminal pairs 102. The requisite number of long jump terminal pairs 102 to be included in any given row of a subarray under the assumed worst case conditions is readily ascertainable from the following expression $$l_j = \sqrt{(N/2m^2)},$$

wherein $l_j$ represents the number of long jump terminal pairs 102 along any row in a subarray, $N$ represents the total number of terminal pairs 101 on the main distribution frame, and $m^2$ represents the number of terminal pairs 101 along any column of the total array $N$.

An example using the above might be a case where N is equal to eighty thousand and $m^2$ is equal to one hundred. For this case there would be 10 subarrays in a column of subarrays with each subarray having 10 terminal pairs 101 per column. The number of subarrays in a row of subarrays would be 20 and each subarray would have 40 terminal pairs 101 per row. Of the 40 terminal pairs 101 per row, 20 in each row would be used as long jump terminal pairs 102, 10 would be used as subscriber line terminal pairs 103 and 10 would be used as switching equipment terminal pairs 104. This distribution of terminal pairs 101 in a subarray fulfills the requirement of having sufficient long jump terminal pairs 102 in a subarray to enable that subarray to be connectable to every other subarray while also including equal numbers of subscriber line terminal pairs 103 and switching equipment terminal pairs 104. The further condition of having the sum of the subscriber line terminal pairs 103 and the switching equipment terminal pairs 104 equal to the number of long jump terminal pairs 102 is also satisfied by this distribution.

It should be noted that neither of the terminal pair groupings shown in subarrays 1, 2 and 2, 1 in FIG. 1 have equal numbers of subscriber line terminal pairs 103 and switching equipment terminal pairs 104 in any given row. However, equal numbers of subscriber line terminal pairs 103 and switching equipment terminal pairs 104 are included in each subarray, and for ease of discussion can be considered as being equally divided among every row.

Before describing the remaining steps of the interconnection wiring technique as applied to the worst case situation described above, a consideration of the second set of operating conditions, corresponding to the installation of a new main distribution frame, will be undertaken. This should simplify the ensuing discussion, since after partitioning the array N of terminal pairs 101 into subarrays and categorizing the terminal pairs 101 according to function, the remaining steps apply equally to both sets of operating conditions under consideration.

The partitioning and categorizing steps as utilized in the more favorable circumstances surrounding the wiring of a new main distribution frame are best understood by referring to subarrays 2, 1 and 2, 2 in FIG. 1. It is to be noted that the more favorable operating conditions arise from the fact that in the installation of a new frame none of the subscriber line terminal pairs 103 or switching equipment terminal pairs 104 have been assigned. Consequently, preferential terminal assignment can be more advantageously utilized as compared to its utilization on an installed and working main frame whereon some of the terminal assignments are not readily changeable. In subarray 2, 1 the functional categorization of terminal pairs 101 is the same as is used in subarray 1, 2. However, in subarray 2, 1 the grouping of terminal pairs 102 through 104 is somewhat different. In this instance the long jump terminal pairs 102 are all grouped together for ease of identification as to location in the subarray. The subscriber line terminal pairs 103 and the switching equipment terminal pairs 104 are also grouped together for the same reason.

Another way to functionally categorize the terminal pairs 101 is shown in subarray 2, 2. In this case the subscriber line terminal pairs 103 and the switching equipment terminal pairs 104 are taken together and considered as business terminal pairs 105. The designation of the subscriber line terminal pairs 103 and switching equipment terminal pairs 104 as business terminal pairs 105 is not to imply any new class of service, but merely serves as a common name for those terminal pairs used in supplying customer services. The advantage of using this approach is that it simplifies somewhat the partitioning of the array N of terminal pairs 101 into subarrays.

In the partitioning of the array N of terminal pairs 101, when the terminal pairs 101 have been functionally categorized as long jump terminal pairs 102 and business terminal pairs 105, the latter being represented as "□'s" as illustrated in subarray 2, 2 of FIG. 1, the optimum size of the partitioned subarray allowing for preferential terminal assignment is ascertained in the following manner. An interconnection success rate, S, is determined based on traffic load balance, terminal assignment considerations and the maximum length of jumper cable which can be readily installed or removed. This success rate is defined as the fraction of jumper cables which are connectable within a predetermined distance from an originating subarray, distance being measured in feet of jumper cable. The interconnection success rate will have a value between zero and one with the larger values allowing for longer length jumper cables. Since the total number of terminal pairs 101 on the main frame is N and since the number of terminal pairs 101 along any given column is $m^2$, the width in terminal pairs, $l'_j$, of a block of long jump terminal pairs 102 is determined according to the following expression $$l'_j = \sqrt{N/m^2\, R/(R+1)},$$

where $R$ represents the ratio of the number of long jump terminal pairs 102 to the number of business terminal pairs 105 and is equal to the quantity $(l-S)$. Having ascertained the width in terminal pairs, $l'_j$, of a block of long jump terminal pairs 102, the width in terminal pairs, $k'$, of the block of business terminal pairs 105 to be included in a subarray along with the long jump terminal pairs 102, is determined from the following expression $$k' = l'_j/R.$$

The number of subscriber line terminal pairs 103 and switching equipment terminal pairs 104 in the block of business terminal pairs 105 is the same in order to optimize the advantages resulting from the preferential terminal assignment scheme.

An example illustrating the above is a case where the number of terminal pairs 101 in the array N is 30,000 and the number of terminal pairs 101 in any column is 100. Assuming a case where the interconnection success rate, S, to be achieved is one-half, then the ratio of long jump terminal pairs 102 to business terminal pairs 105 is equal to one-half. Accordingly, the width of the block of long jump terminal pairs 102 is 10 and the width of the block of business terminal pairs 105 is 20. The business terminal pairs 105 are further divided equally between subscriber line terminal pairs 103 and switching equipment terminal pairs 104. Hence, each subarray has 100 long jump terminal pairs 102, 100 subscriber line terminal pairs 103 and 100 switching equipment terminal pairs 104.

It should be noted that the functional categorization of subscriber line terminal pairs 103 and switching equipment terminal pairs 104 as business terminal pairs 105 is not to affect the unique marking for identification of these terminal pairs in any given subarray. The subscriber line terminal pairs 103 and switching equipment terminal pairs 104 are for example, color-coded the same as set out above with regard to the worst case operating conditions.

Figure 2:
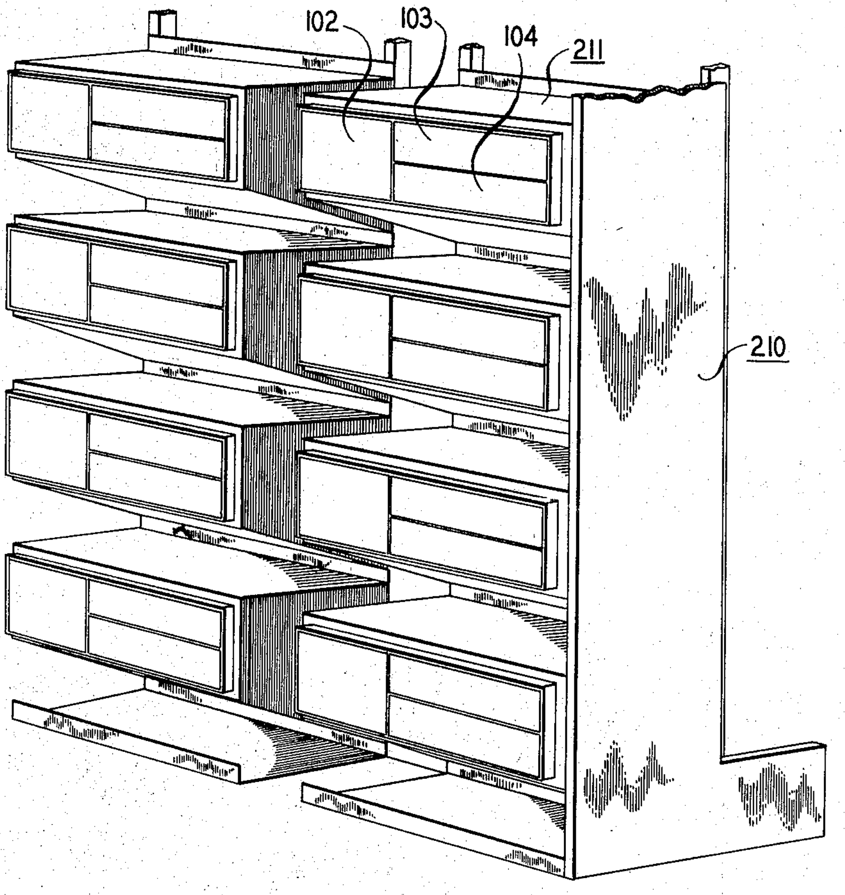
FIG. 2 is a front view of a main distribution frame with the array of terminal pairs partitioned into a plurality of subarrays, each subarray being physically realized as a connector block.
Figure 3:
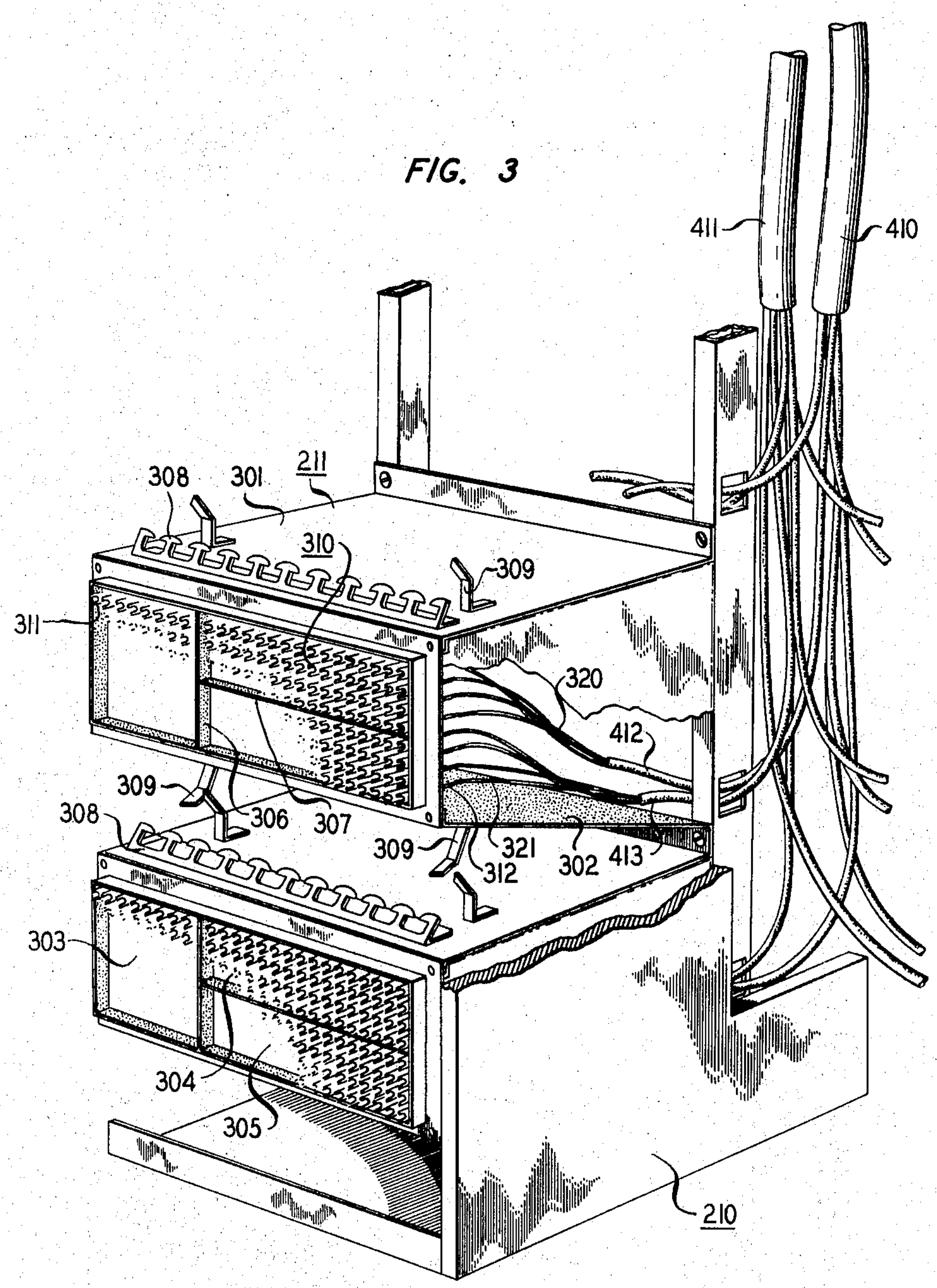
FIG. 3 is a partial perspective view of the main frame illustrating individual subarray connector blocks.

To summarize, two sets of operating conditions for a main distribution frame have been considered, so far as the steps of partitioning of the array N of terminal pairs 101 into a plurality of subarrays and functionally categorizing the terminal pairs 101 by color coding are concerned in the wiring of such a frame. The results of these steps in the interconnection wiring technique as applied to the wiring of a new main distribution frame are best shown in FIG. 2. Illustrated is main distribution frame support structure 210 on which are mounted a plurality of connector blocks 211. The connector blocks 211 correspond to the subarrays referred to above in the description pertaining to FIG. 1. Each of the connector blocks 211, as shown in FIG. 3, includes mounting brackets 301 and 302 to which are affixed a block 303 of long jump terminal pairs 102 color-coded red, a block 304 of subscriber line terminal pairs 103 color-coded blue and a block 305 of switching equipment terminal pairs 104 color-coded yellow. Divider strips 306 and 307 separate blocks 303 through 305 from one another. Also affixed to mounting brackets 301 and 302 are fanning strips 308 and jumper cable retainer clips 309. Terminals 310 have a double-end structure with a quick-clip terminal 311 at one end and a solderless wirewrap terminal 312 at the opposite end. All permanent connections, such as the termination of subscriber line cable pairs 320 and switching equipment cable pairs 321, are made on the wirewrap terminals 312 located on the back plane of connector block 211. All jumper cable cross connections are made on the front plane of connector block 211 using the quick-clip terminals 311.

The remaining steps in the application of the interconnection wiring technique, for both sets of operating conditions under consideration, after the subscriber line cable pairs 320 and the switching equipment cable pairs 321 are terminated on the rear portion of the connector blocks 211, are those of electrically interconnecting with permanently installed back plane wiring each block 303 of long jump terminal pairs 102 with every other block 303 of long jump terminal pairs 102, and interconnecting specified subscriber line terminal pairs 103 with specified switching equipment terminal pairs 104 by means of jumper cables.

Figure 4:
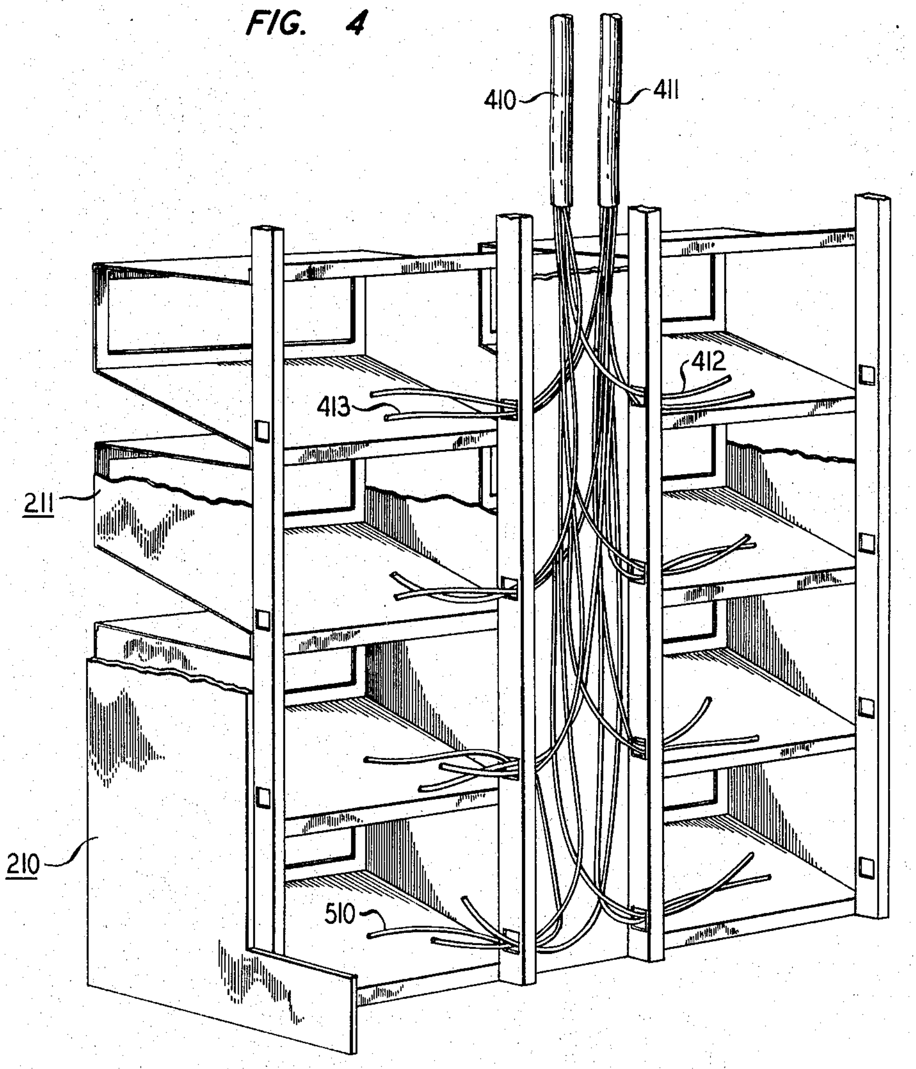
FIG. 4 is a rear view of the main distribution frame partially illustrating back plane cable routing.

FIG. 4 illustrates the routing of a number of subscriber line cables 410 and switching equipment cables 411 to a plurality of connector blocks 211. In routing subscriber line cable 410 on the frame support structure 210, the cable is subdivided into smaller bundles 412 with bundles 412 being terminated on the subscriber line terminal blocks 304 of connector blocks 211. Similarly, the switching equipment cable 411 is subdivided into smaller bundles 413 with bundles 413 being routed to and terminated on the switching equipment terminal blocks 305 of the connector blocks 211. The permanently installed back plane wiring interconnecting each block 303 of long jump terminal pairs 102 with every other block 303 of long jump terminal pairs 102 is also illustrated. A further discussion with regard to the permanently installed back plane interconnections is presented hereinbelow.

With the subscriber line cables 410 and switching equipment cables 411 terminated on the rear portion of connector blocks 211, the next step is to interconnect long jump terminal pairs 102 in a particular connector block 211 with long jump terminal pairs 102 in every other connector block 211. To ensure that each connector block 211, which includes a block 303 of long jump terminal pairs 102, is connected to every other connector block 211, the back plane interconnection wiring is implemented in the following manner.

An $i, j^{th}$ long jump terminal pair 102 of a $k, l^{th}$ connector block 211 is electrically interconnected with a $k, l^{th}$ long jump terminal pair 102 of an $i, j^{th}$ connector block 211. Here $i$ and $k$ represent row locations and $j$ and $l$ represent column locations, respectively, in each of the blocks 303 of long jump terminal pairs 102. It should be noted that the interconnection of blocks 303 of long jump terminal pairs 102 in accordance with this scheme has the following useful property: all long jump terminal pairs 102 which connect to those in a given column also themselves lie in a single column. The same is true of rows. This simplifies the routing of the permanently wired connections on the back plane.

Figure 5:
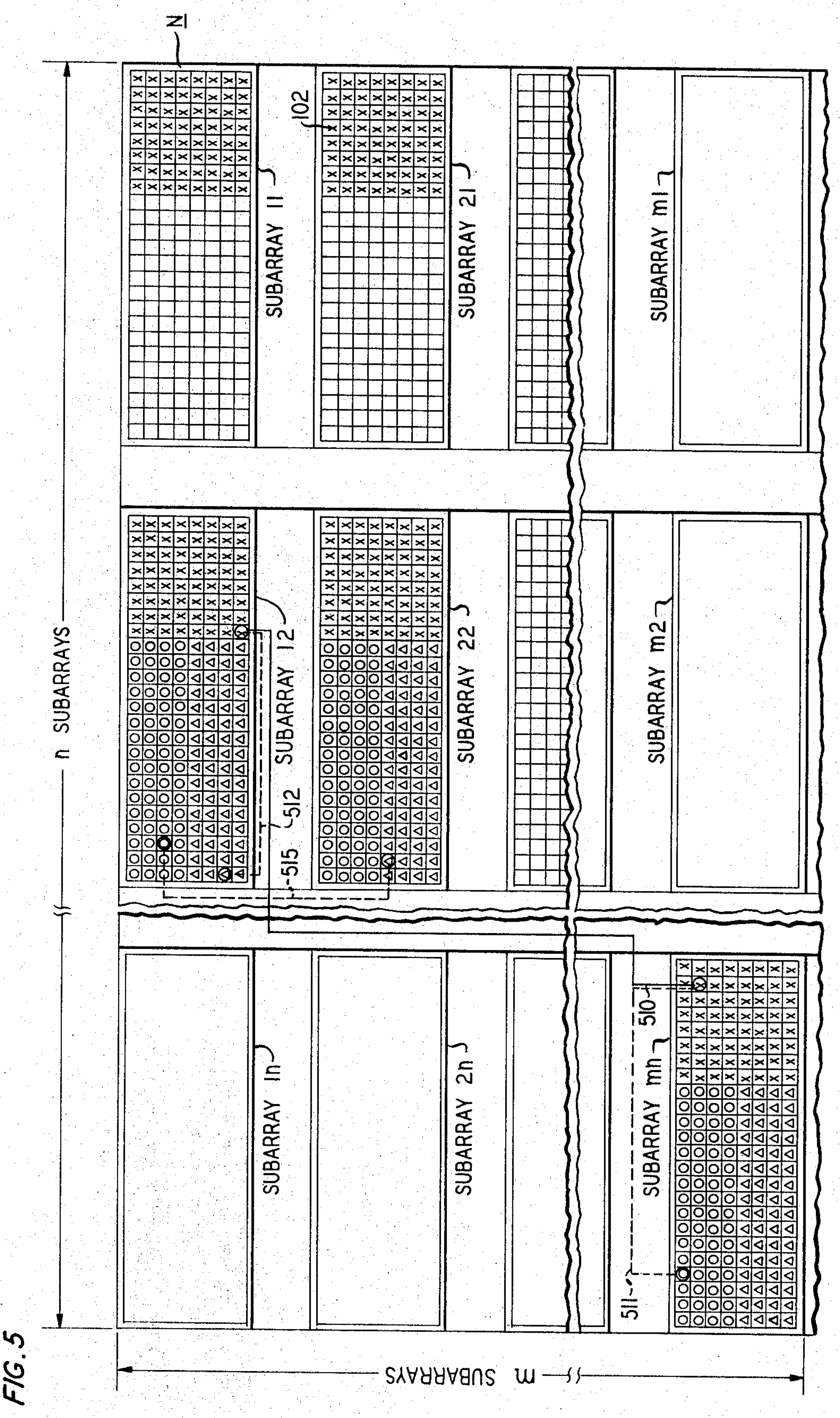
FIG. 5 is a schematic representation of the subarray connector block interconnection wiring as viewed from the rear of the main frame.

Application of this step is most clearly illustrated in FIG. 5, which is a schematic representation of the subarray connector blocks 211 as viewed from the rear of the main frame. Throughout the remaining description the term subarray will be used to indicate what is physically exemplified as a connector block 211, but which is in a schematic sense better understood by being referred to as a subarray. For example, interconnecting the long jump terminal pair 102 in row 1 column 2 of subarray $m, n$ with the long jump terminal pair 102 in row $m$ column $n$ of subarray 1, 2 with cable 510 ensures that specified subscriber line terminal pairs 103 in subarray m, n are interconnectable with specified switching equipment terminal pairs 104 in subarray 1, 2 with at most two short jumper cables 511 and 512. The jumper cables 511 and 512 are shown dotted since they are physically located on the front of the main frame 210. In this example connecting the specified subscriber line terminal pair 103 in subarray $m, n$ to the long jump terminal pair 102 in row 1 column 2 with jumper cable 511 and connecting the specified switching equipment terminal pair 104 in subarray 1, 2 to the long jump terminal pair 102 in row $m$ column $n$ with jumper cable 512 completes the interconnection.

It is to be noted that in a physical realization of the foregoing steps, one end of the jumper cable 511 is affixed to the specified subscriber line terminal pair 103 in the block 304, the jumper cable 511 is then routed upwards out of the block 304 and through the fanning strip 308. In those cases where the specified switching equipment terminal pair 104 is not in the same connector block 211 as the subscriber line terminal pair 103, the jumper cable 511 is further routed behind jumper cable retainer clips 309. At the opposite termination point the jumper cable 511 is routed out from behind the jumper cable retainer clips 309, through fanning strip 308, and terminated on the specified switching equipment terminal pair 104.

Utilization of the space behind jumper cable retainer clips 309 for holding jumper cables used for completing connections between two different connector blocks 211 partially accounts for the depth of mounting brackets 301 and 302. The other reason for the mounting brackets 301 and 302 having such a depth is to provide adequate space for the fanout and permanent termination of the back plane wiring.

Figure 6:
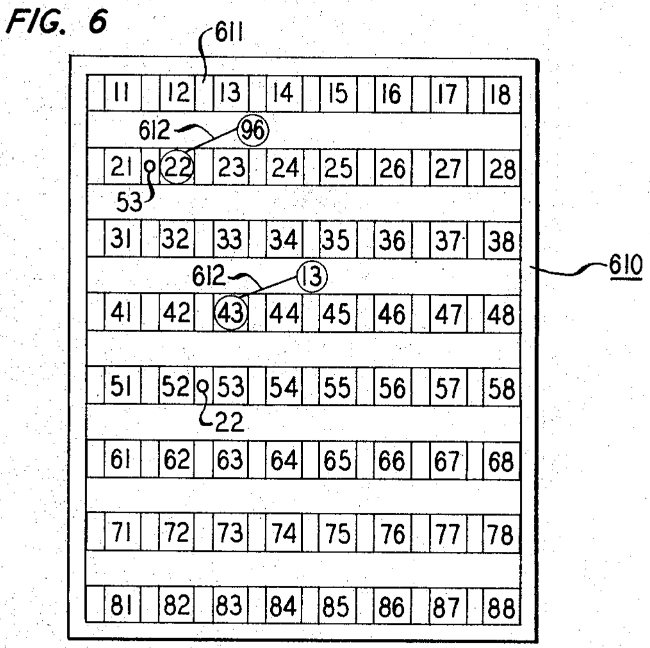
FIG. 6 is a schematic representation of a combined service order/wiring template card.

To facilitate the completion of the interconnection using the shortest possible jumper cables 511 and 512, a combination service order/wiring template card 610, shown in FIG. 6, is to be utilized. The card 610 is physically the same size, in height and width, as the block 303 of long jump terminal pairs 102. A plurality of apertures 611 are punched in the card 610. These apertures 611 are in one-to-one correspondence with both the number and the location of the long jump terminal pairs 102 in block 303. The number and location of apertures 611 is dependent upon the earlier steps of partitioning and categorizing, since it is these two steps which define the size of the block 303 of long jump terminal pairs 102. Adjacent to each of the apertures 611 is a two-digit address, the first digit representing a row location and the second digit representing a column location of the long jump terminal pairs 102 in the block 303. The card 610, illustrated in FIG. 6, assumes that 45 long jump terminal pairs 102 are in block 303.

In using the card 610 in a service order capacity, a service representative in the business office assigns the particular subscriber line terminal pair 103 and switching equipment terminal pair 104 to be interconnected in response to a customer's request for service. These terminal pairs are indicated on the card 610 by an address consisting of a subarray designation and a terminal number within that subarray. Perhaps the simplest way to indicate this information is to write the terminal numbers on the card 610 and to connect the terminal number with the subarray address by a penciled leader 612. The subarray address corresponds to the two-digit address adjacent to each of the apertures 611 in card 610.

The assignment of the particular subscriber line terminal pair 103 and switching equipment terminal pair 104 to be interconnected is made in accordance with the preferential terminal assignment plan so that a connection can be advantageously effected with the shortest possible jumper cables. When the specified subscriber line terminal pair 103 and the specified switching equipment terminal pair 104 are in the same or adjacent subarrays interconnection is normally made with a single jumper cable. An example of a direct connection is illustrated in FIG. 5. For this example it is assumed that subscriber line terminal pair 3, 3 in subarray 1, 2 is to connect to switching equipment terminal pair 1, 2 in subarray 2, 2. This connection is completed with jumper cable 515, which is shown as a dashed line since jumper cable connections are made on the front plane of the main frame 210. When direct connection is precluded, two jumper cables and the permanently wired intermediate path are used to complete the connection. An example illustrating this type of connection is given following a description of the card 610 as it is used in its wiring template capacity.

In either case, whether the interconnection between the specified subscriber line terminal pair 103 and the specified switching equipment terminal pair 104 is made directly with a single jumper cable or with a pair of jumper cables and the permanently wired long jump connection between subarrays, the information regarding the number of jumper cables required to complete the interconnection is readily ascertainable from the card 610. This follows from the fact that the wireman is aware of the number of subarrays which are within range of a given subarray as fixed by the maximum length of jumper cable consistent with the interconnection success rate to be achieved. For example, assume that direct connections are allowed within any given subarray and between the given subarray and any of its immediate neighboring subarrays. By noting the subarray addresses of the subscriber line terminal pair 103 and the switching equipment terminal pair 104 as presented on card 610, the number of jumper cables required to complete the interconnection is readily ascertained.

Once it has been associated how many jumper cables are to be used to complete the connection, card 610 is then used in its wiring template capacity. When card 610 is placed over any block 303 of long jump terminal pairs 102 so that one terminal pair lies just within each aperture 611, then the number on the card just to the right of any long jump terminal pair 102 indicates the subarray to which that terminal pair is connected. The card 610 may thus be seen as a map of the whole frame showing the subarrays to which the various terminal pairs lead. The interconnections of long jump terminal pairs 102 are such that the same map, as represented by card 610, is correct for every subarray. This feature makes possible a very simple procedure for finding and recording the endpoints of suitable long jump connections. By placing card 610 over any block 303 of long jump terminal pairs 102 lying within the predetermined interconnection success rate separation distance of the specified subscriber line terminal pair 103, it being recalled that this distance is fixed by the maximum allowable length of jumper cable that can be advantageously used to make a direct connection, an idle long jump terminal pair 102 having its opposite end within the same predetermined interconnection success rate separation distance of the specified switching equipment terminal pair 104 is readily located. If the long jump terminal pairs 102 in the source subarray that surround the long jump terminal pair 102 having an address which corresponds to the destination subarray are examined and if an idle long jump terminal pair 102 is found, it is certain that an idle long jump terminal pair 102 is available for completing the interconnection at the destination subarray, since the $i, j^{th}$ long jump terminal pair 102 in the long jump block 303 of the $k, l^{th}$ subarray is permanently interconnected to the $k, l^{th}$ long jump terminal pair 102 in the long jump block 303 of the $i, j^{th}$ subarray.

Having identified an idle long jump terminal pair 102 suitable for completing the interconnection between the specified subscriber line terminal pair 103 and the specified switching equipment terminal pair 104, one end of a jumper cable, such as jumper cable 511, is affixed to the idle long jump terminal pair 102 and the opposite end is affixed to the specified subscriber line terminal pair 103. When the idle long jump terminal pair 102 is selected in accordance with the previous steps in the procedure, the corresponding termination point for the interconnected long jump terminal pair 102 is fixed as noted above. Consequently, having selected the idle long jump terminal pair 102, its location in the block 303 of long jump terminal pairs 102 gives the location of the subarray to which it is interconnected.

Once the corresponding subarray of long jump terminal pairs 102 is located, all that remains is to identify the long jump terminal pair 102 to which the specified switching equipment terminal pair 104 is to connect. This identification is readily made by placing the card 610 over the block 303 of long jump terminal pairs 102 and noting from the address labeling on the card 610 the particular long jump terminal pair 102 being sought. Having so located the long jump terminal pair 102, connection between it and the specified switching equipment terminal pair 104 is effected by affixing one end of a jumper cable, such as jumper cable 512 to the long jump terminal pair 102 with the opposite end being affixed to the specified switching equipment terminal pair 104. This completes the desired interconnection between the specified subscriber line terminal pair 103 and the specified switching equipment terminal pair 104.

An example, illustrating the foregoing, is the case where the specified subscriber line terminal pair 103 is at location 9, 6 in subarray 2, 2 and the specified switching equipment terminal pair 104 is at location 1, 3 in subarray 4, 3. The locations 9, 6 and 1, 3 in subarrays 2, 2 and 4, 3, respectively, are locations of a subscriber line terminal pair 103 and a switching equipment terminal pair 104 and are not to be confused with the locations of long jump terminal pairs 102 associated with each of these subarrays. Since the subscriber line terminal pair 103 and the switching equipment terminal pair 104 are located in nonadjacent subarrays, direct interconnection will not be considered. Therefore, two jumper cables are to be utilized to complete the interconnection. Placement of card 610 over the subarray 2, 2 of long jump terminal pairs 102 results in the identification of long jump terminal pair 5, 3, for example, as being idle. Consequently, long jump terminal pair 2, 2 in subarray 5, 3 is idle. On the card 610, the aperture 5, 3, indicating this location, is encircled by the wireman. Also, the aperture 2, 2, indicating the location of the array in which the idle terminal 5, 3 was found, is encircled. This marking of the card 610 allows rapid location of the other end of the permanently wired long jump connection. Subarray, 5, 3 being adjacent to subarray 4, 3 in which the switching equipment terminal pair 1, 3 is located is within the prescribed interconnection success rate separation distance. The interconnection is completed by affixing one end of a first jumper cable to subscriber line terminal pair 9, 6 in subarray 2, 2 with the opposite end being affixed to long jump terminal pair 5, 3 also in subarray 2, 2. One end of a second jumper cable is affixed to switching equipment terminal pair 1, 3 in subarray 4, 3 with the opposite end being affixed to long jump terminal pair 2, 2 in subarray 5, 3.

In summary, an interconnection wiring technique and apparatus are described which allows any specified subscriber line terminal pair 103 to be connectable to any specified switching equipment terminal pair 104 using at most two relatively short jumper cables. Utilization of this technique greatly reduces jumper cable congestion on the main frame 210 since each jumper cable is only a few feet in length and therefore is easily removed when wiring changes are made.

In all cases it is understood that the above described embodiment is illustrative of but a small number of the many possible specific embodiments which can represent applications of the principles of the invention. Thus, numerous and varied other steps can readily be devised in accordance with these principles by those skilled in the art without departing from the spirit and scope of the invention.

What is claimed is:

1. An interconnection wiring technique for use on a main distribution frame having an array of uniformly distributed terminal pairs thereon with subscriber line cables and switching equipment cables being terminated on a portion of said array of terminal pairs, said technique providing for the interconnection of specified subscriber line terminal pairs with specified switching equipment terminal pairs with jumper cables and comprising the steps of partitioning said array of terminal pairs on said main distribution frame into a plurality of subarrays with each subarray having at least twice as many terminal pairs as there are subarrays, dividing each subarray of uniformly distributed terminal pairs into three categories of terminal pairs designated as subscriber line terminal pairs, switching equipment terminal pairs, and long jump terminal pairs, respectively, electrically interconnecting each subarray with every other subarray with a permanently wired back plane cable between long jump terminal pairs, and connecting directly with a jumper cable said specified subscriber line terminal pairs with said specified switching equipment terminal pairs where said terminal pairs are within a predetermined separation distance, and where said terminal pairs are beyond said predetermined separation distance connecting said specified subscriber line terminal pairs to long jump terminal pairs which are within said predetermined separation distance of said subscriber line terminal pairs and connected to long jump terminal pairs within said predetermined separation distance of said specified switching equipment terminal pairs.

2. The interconnection wiring technique in accordance with claim 1 wherein the step of dividing each subarray of uniformly distributed terminal pairs into three categories of terminal pairs further comprises the steps of marking those terminal pairs in odd numbered columns of each of said subarrays with a first unique designation whereby these terminal pairs are identifiable as long jump terminal pairs, marking those terminal pairs not previously marked which are in odd rows of each of said subarrays with a second unique designation whereby these terminal pairs are identifiable as subscriber line terminal pairs, and marking those terminal pairs not previously marked which are in even rows of each of said subarrays with a third unique designation whereby these terminal pairs are identifiable as switching equipment terminal pairs.

3. The interconnection wiring technique in accordance with claim 1 wherein the electrically interconnecting step includes the step of connecting an $i, j^{th}$ long jump terminal pair in a $k, l^{th}$ subarray to a $k, l^{th}$ long jump terminal pair in an $i, j^{th}$ subarray where $i$ and $k$ represent row locations and $j$ and $l$ represent column locations, respectively in said subarrays.

4. An interconnection wiring technique for use on a main distribution frame having N uniformly distributed terminal pairs thereon where N is the total number of terminal pairs in an array having $m^2$ terminal pairs along any given column and $N/m^2$ terminal pairs along any given row, said array having subscriber line cables and switching equipment cables terminated on a portion of said array of terminal pairs, said technique providing for the interconnection of specified subscriber line terminal pairs with specified switching equipment terminal pairs with jumper cables and comprising the steps of dividing said $m^2$ terminal pairs in any given column into a plurality of groups each group containing $m$ contiguous terminal pairs, ascertaining the ratio of long jump terminal pairs to business terminal pairs, business terminal pairs being defined as the combination of subscriber line terminal pairs and switching equipment terminal pairs, whereby a predetermined interconnection success rate is achievable, said success rate being defined as the probability of completing a connection with a jumper cable having a length less than a predetermined value, dividing said $(N/m^2)$ terminal pairs in any given row into a plurality of groups, each group including a subgroup of $l'_j$ long jump terminal pairs and a subgroup of business terminal pairs so that the array includes plural blocks of long jump terminal pairs, each such block including $1'_j \times m$ long jump terminal pairs, electrically interconnecting each block of long jump terminal pairs with every other block of long jump terminal pairs, said interconnection being made with a permanently wired back plane cable, and connecting directly with a single jumper cable said specified subscriber line terminal pair with said specified switching equipment terminal pair where said terminal pairs are within the separation distance established by said interconnection success rate, and where said terminal pairs are beyond said separation distance connecting said specified subscriber line terminal pair to a long jump terminal pair within said separation distance with a first jumper cable and connecting said specified switching equipment terminal pair to a corresponding long jump terminal pair within said separation distance with a second jumper cable, said corresponding long jump terminal pairs being electrically interconnected and thereby completing the interconnection.

5. The interconnection wiring technique in accordance with claim 4 wherein the electrically interconnecting step includes the step of connecting an $i, j^{th}$ long jump terminal pair of a $k, l^{th}$ subarray to a $k, l^{th}$ long jump terminal pair of an $i, j^{th}$ subarray where $i$ and $k$ represent row locations and $j$ and $l$ represent a column locations, respectively, in each of said blocks of long jump terminal pairs.

6. The interconnection wiring technique in accordance with claim 4 wherein the step of connecting a specified subscriber line terminal pair to a long jump terminal pair includes the steps of placing a template having a plurality of apertures therein, said apertures being in one-to-one correspondence with the number and location of long jump terminal pairs in any block of long jump terminal pairs and being labelled accordingly, over said block of long jump terminal pairs lying within said predetermined interconnection success rate separation distance with respect to said specified subscriber line terminal pair, selecting an idle long jump terminal pair having an interconnected opposite end point lying within said predetermined separation distance of said specified switching equipment terminal pair, said interconnected opposite end point being identified by said labelling on said template, and affixing one end of a jumper cable to said specified subscriber line terminal pair with the other end being affixed to said selected long jump terminal pair.

7. The interconnection wiring technique in accordance with claim 6 wherein the step of connecting a specified switching equipment terminal pair to a long jump terminal pair, which is electrically interconnected with the long jump terminal pair to which the specified subscriber line terminal pair is connected, further includes the steps of placing said template over said block of long jump terminal pairs to which said specified switching equipment terminal pair is to connect, identifying said long jump terminal pair to be connected from said labelling on said template, and affixing one end of a jumper cable to said specified switching equipment terminal pair with the other end being affixed to said identified long jump terminal pair.

8. A main distribution frame used for effecting cross connections between subscriber line cables and switching equipment cables with jumper cables comprising a frame support structure, a plurality of connector blocks affixed to said frame support structure, each of said connector blocks having a plurality of electrical terminal pairs uniformly distributed thereon with a first portion of said terminal pairs designated as subscriber line terminal pairs, a second portion of said terminal pairs designated as switching equipment terminal pairs, and a third portion of said terminal pairs designated as long jump terminal pairs, the size of each of said connector blocks being a function of an interconnection success rate that is to be achieved, said interconnection success rate being defined as the probability of completing connections between specified subscriber line terminal pairs and specified switching equipment terminal pairs with a single cross connecting jumper cable, means for terminating said subscriber line cables and said switching equipment cables on said subscriber line terminal pairs and said switching equipment terminal pairs, respectively, on said connector blocks, and means for terminating said cross connecting jumper cables on said subscriber line terminal pairs and said switching equipment terminal pairs.

9. A main distribution frame used for effecting cross connections between subscriber line cables and switching equipment cables with jumper cables comprising a frame support structure, a plurality of connector blocks affixed to said frame support structure, each of said connector blocks having a plurality of electrical terminal pairs uniformly distributed thereon with a first portion of said terminal pairs designated as subscriber line terminal pairs, a second portion of said terminal pairs designated as switching equipment terminal pairs, and a third portion of said terminal pairs designated as long jump terminal pairs, means for permanently interconnecting said plurality of connector blocks to one another through said long jump terminal pairs, means for terminating said subscriber line cables and said switching equipment cables on said subscriber line terminal pairs and said switching equipment terminal pairs, respectively, on said connector blocks, and means for terminating said cross connecting jumper cables on said subscriber line terminal pairs and said switching equipment terminal pairs.

10. The main distribution frame in accordance with claim 9 wherein said subscriber line cable terminations and said switching equipment cable terminations are on one side of said connector block, and said cross connecting jumper cable terminations are on another side of said connector block.

11. The main distribution frame in accordance with claim 9 further including means for selectively connecting a specified subscriber line terminal pair to a first long jump terminal pair within a predetermined interconnection success rate separation distance of said specified subscriber line terminal pair, said interconnection success rate being defined as the probability of completing connections between specified subscriber line terminal pairs and specified switching equipment terminal pairs with a single cross connecting jumper cable, and, means for connecting a specified switching equipment terminal pair to a second long jump terminal pair within said predetermined interconnection success rate separation distance of said specified switching equipment terminal pair, said first and second long jump terminal pairs being interconnected by said permanent interconnecting means.

* * * * *